US006442518B1

(12) United States Patent
Van Thong et al.

(10) Patent No.: US 6,442,518 B1
(45) Date of Patent: Aug. 27, 2002

(54) METHOD FOR REFINING TIME ALIGNMENTS OF CLOSED CAPTIONS

(75) Inventors: Jean-Manuel Van Thong, Arlington; Pedro Moreno, Cambridge, both of MA (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/353,729

(22) Filed: Jul. 14, 1999

(51) Int. Cl.[7] .................................... G10L 15/26
(52) U.S. Cl. .......................... 704/235; 704/271
(58) Field of Search ........................... 704/235, 241, 704/270, 267, 271, 260, 263

(56) References Cited

U.S. PATENT DOCUMENTS

| | | | |
|---|---|---|---|
| 5,561,457 A | * 10/1996 | Cragun et al. ............ | 348/13 |
| 5,649,060 A | 7/1997 | Ellozy et al. ............ | 395/2.87 |
| 5,737,725 A | * 4/1998 | Case ..................... | 704/260 |
| 5,828,994 A | 10/1998 | Covell et al. ........... | 704/211 |
| 5,835,667 A | * 11/1998 | Wactlar et al. .......... | 386/96 |
| 6,023,675 A | 2/2000 | Bennett et al. .......... | 704/255 |
| 6,076,059 A | * 6/2000 | Glickman et al. ........ | 704/260 |
| 6,181,351 B1 | * 1/2001 | Merrill et al. .......... | 345/473 |
| 6,185,329 B1 | * 2/2001 | Zhang et al. ............ | 382/176 |
| 6,260,011 B1 | 7/2001 | Heckerman et al. ...... | 704/235 |
| 6,263,507 B1 | 7/2001 | Ahmad et al. ........... | 725/134 |

OTHER PUBLICATIONS

Hauptmann, Alexander G., et al., "Story Segmentation and Detection of Commercials in Broadcast News Video," ADL–98 Advances in Digital Libraries Conference, Apr. 22–24, 1988.

Robert–Ribes, Jordi, "On the Use of Automatic Speech Recognition for TV Captioning," Proceedings, ICSLP, 1998.

Robert–Ribes, J., et al., "Automatic Generation of Hyperlinks Between Audio and Transcripts," Proceedings, Euro-Speech 1997.

Moreno, Pedro J., et al., "A Recursive Algorithm for the Forced Alignment of Very Long Audio Segments," Proceedings, ICSLP, 1998.

Covell, M., et al., "MACH1: Nonuniform Time–Scale Modification of Speech," *Proceedings of the 1998 IEEE International Conference for Acoustics, Speech and Signal Processing*, 1998: 349–352, vol. 1.

* cited by examiner

*Primary Examiner*—Marsha D. Banks-Harold
*Assistant Examiner*—Abul K. Azad
(74) *Attorney, Agent, or Firm*—Hamilton, Brook, Smith & Reynolds, P.C.

(57) ABSTRACT

A method and apparatus are provided for refining time alignments of closed captions. The method automatically aligns closed caption data with associated audio data such that the closed caption data can be more precisely indexed to a requested keyword by a search engine. Further, with such a structure, the closed captions can be made to appear and disappear on a display screen in direct relation to the associated spoken words and phrases. Accordingly, hearing impaired viewers can more easily understand the program that is being displayed.

9 Claims, 6 Drawing Sheets

METHOD FOR REFINING TIME ALIGNMENTS OF CLOSED CAPTIONS

BACKGROUND OF THE INVENTION

Generally speaking, closed captions are text messages that appear at the bottom of a display screen during movies, television programs, news casts and other productions, to aid hearing impaired persons to understand the content of the production. The closed captions typically appear and disappear at times that are roughly synchronized to words that are spoken in the production. For example, where a television program includes a number of people engaged in conversation, the content of that conversation would appear at the bottom of the screen roughly synchronous to each conversant's dialogue. Further, the closed captions could also indicate the presence of other sounds such as the playing of music or of a door slamming, to more completely indicate auditory clues that convey to the viewer what is happening.

Closed captions can be generated either on-line or off-line. On-line closed captions are typed into a system that merges them with the production while the action is occurring, such as during a live television news broadcast. Because of the immediacy of on-line generated closed captions, a higher percentage of errors are generated and the captions can be significantly misaligned with the corresponding spoken words. Alternatively, off-line closed captions typically include fewer errors due to the fact that they are generated post production, i.e. from pre-recorded materials such as movies or taped television programs.

Off-line closed captions are sometimes referred to as "pop-on captions" due to the fact that they pop onto the screen as an actor speaks. Accordingly, off-line closed captions can be well placed such that they more closely agree with the actor's speech. However, even off-line closed captions can be misaligned with respect to the related spoken words. To further aid the viewer, the off-line closed captions can be manipulated to appear shortly before the actor speaks and disappear shortly after the actor stops speaking, thereby providing extra reading time.

Regardless of the method used to perform closed captioning, an approximate textual transcript of the program is produced. That textual transcript includes information that indicate when each caption should appear on the screen and when it should disappear. That information includes the text of the caption, the time stamp when they should be displayed on the screen and the duration of time that they should remain displayed. Once the closed caption data is stored in a computer system memory, along with the related digitized audio and video data, it can be used in conjunction with an internet search engine to index portions of the related program. Accordingly, a search engine such as Compaq Computer Corporation's AltaVista engine can retrieve relevant audio, video or transcript portions of programs in response to a keyword selected by a system user. Once the data is located, the selected portion of the program can be displayed either textually or in a multimedia manner.

While searching multimedia documents is useful for many applications, it requires that the closed caption data is very closely aligned with the related audio and video data. For example, if the closed caption data is closely aligned to the audio and video data, a user will not need to parse through a large amount of unrelated program time to view the desired information. It has generally been determined that in order for such searching to be effective, the alignment of the audio and video data to the closed caption data should be accurate to within a fraction of a second. In other words, there should be a very small discrepancy between the time that a word is spoken on the program and the time stamp value of the corresponding closed caption word.

Prior art approaches have been used to automatically or semi-automatically generate closed caption data from a non-time-stamped transcription of an associated audio data stream. Such approaches typically include a series of steps that are recursively applied until closed captions have been generated for the entire transcript. During a first pass, a vocabulary and language model is generated using the words of the entire transcript. That vocabulary and language model is used by a speech recognizer to generate a hypothesized word list from the audio data. The word list is annotated with time stamps that indicate the relative time within the audio stream that each word or group of words was detected. Since the hypothesized word list is only a best guess at the spoken words, a confidence score is generated that indicates the likelihood that a given word has been correctly recognized.

After the speech recognition operation is complete, the transcript is broken into sections that are delineated by words, referred to as anchors, that have high confidence scores. During a subsequent pass, a new vocabulary and language model is generated using words from a selected section and the speech recognition process is repeated. During each pass, smaller and smaller sections are identified until a majority of the closed caption stream agrees with the transcript and has been aligned with the audio stream. Such a process is effective for generating closed captions but is extremely time consuming due to its repetitive nature. Further, this approach does not take advantage of pre-existing time stamps, such as those recorded during transcription.

SUMMARY OF THE INVENTION

A method and apparatus is desired for automatically aligning closed caption data with associated audio data such that temporally precise off-line closed captioning operations are no longer necessary; such that closed caption data can be more precisely indexed to a requested keyword by a search engine; and for improving the quality of pre-existing closed captions. Further, with such a structure, closed captions can be made to appear and disappear in direct relation to associated spoken words and phrases. Accordingly, hearing impaired viewers can more easily understand the program that is being displayed.

More specifically, a method and apparatus are provided for aligning roughly aligned closed caption data with associated portions of an audio data stream. The method includes breaking the audio data stream and the roughly aligned closed caption data into a number of sections. The sections are delineated by a selected characteristic of the associated closed caption data, such as a significant time difference between time stamps. The sections are segmented into a number of chunks and the closed captions within each of the chunks are aligned to the associated portion of the audio stream.

The method for aligning roughly aligned closed caption data within a chunk can also include the steps of generating a dictionary, in which each word in the closed caption data is expanded into a sequence of phonemes, and forming a language model. A speech recognition operation is performed on the audio data stream to generate a sequence of words to be later associated with the words of the original transcription, in the audio stream. Subsequently, each word of the closed caption data is matched with a corresponding word in the audio stream. Responsively, the time stamps associated with the words of the closed caption data contained in the chunk are modified in relation to the time stamps of the associated words from the audio stream. The time stamps associated with the words of the closed caption data can be modified to be the same as the time stamps of the associated words from the audio stream. Alternatively, the time stamps associated with the first and last words of the closed caption data can be modified to be a selected time before and after the time stamps of the associated words.

After the chunk is aligned, a subsequent chunk that is associated with another portion of the roughly aligned closed caption data is selected using the last word of the previous chunk, i.e. the anchor, as its first word to which the chunk will be aligned.

The method also determines whether the speech recognition operation has correctly generated the words that correspond to the associated closed caption data. In response to a determination that the speech recognition operation has generated words that do not correspond to the associated closed caption data, a recursive alignment operation is performed. The recursive alignment operation identifies a pair of aligned words that delineates the un-aligned portion of the closed caption data that includes the incorrect words. A language model that includes the words from the un-aligned portion is generated and a second speech recognition operation is performed on the portion of the audio data stream that is associated with the un-aligned portion. Those operations are recursively performed until the roughly aligned closed caption data is aligned with the audio data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Generally, the present invention provides a method for refining time stamps in a closed caption stream such that they are directly aligned with an associated audio stream. Unlike prior art approaches, the instant method aligns the closed captions with the associated audio stream in a single pass using a unique manner of parsing through the data and performing the alignment.

Figure 1:
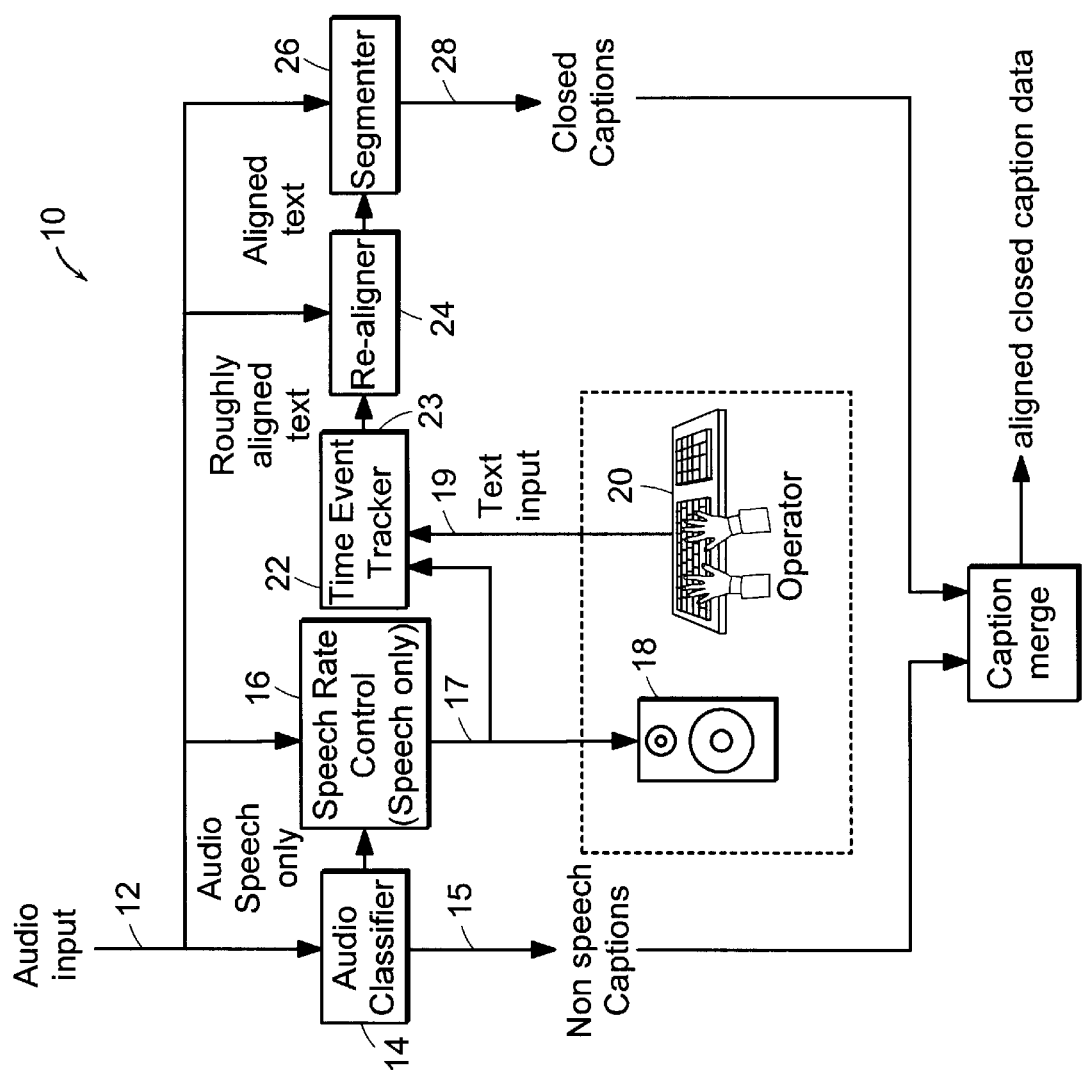
FIG. 1 is a schematic diagram of a semi-automatic system for producing closed captions.

FIG. 1 is a schematic diagram of a system 10 for performing semi-automatic generation of aligned closed captions. The system receives an audio stream 12 associated with a program that is to be closed captioned. That audio stream 12 is input to an audio classifier unit 14 that sequentially analyzes each portion of the audio stream 12. The analysis involves a manner of detecting whether the audio stream 12 includes speech, music or sound audio data. Responsive to a determination that the current portion of the audio stream contains sounds or music, the audio classifier outputs non-speech closed captions that indicate that music is being played or the type of sound that was made. Those closed captions 15 will subsequently be merged with speech related closed captions 28 generated by the rest of the system 10. Alternatively, when the audio classifier 14 determines that the current portion of the audio stream 12 contains speech, it is passed to another unit referred to as the Audio rate control unit 16.

The audio rate control unit 16 outputs the speech portion of the audio stream 12 to a speaker 18 or similar device that allows an operator 20 to listen to the audio and transcribe what is being said. The audio rate control unit 16 also adjusts the rate that the speech data 17 is delivered to the speaker 18 such that the operator 20 can more easily perform the transcription. The rate or frequency of the speech data is adjusted while the pitch or tone of that data remains constant. In other words, the speech data can be sent to the speaker at a slower rate, thereby providing the operator with more time to transcribe the data, while retaining the ability to clearly understand what is being said.

As the speech data 17 is output to the speaker 18, it is also input to a time-event tracker unit 22. Along with the speech data, time-event tracker unit 22 also receives the transcribed closed caption data 19 as it is generated by the operator 20. As the transcribed closed caption data 19 is received by the time-event tracker unit 22, it is interspersed with a time stamp indicating the time at which each word was transcribed. Because the time stamp is dependant upon the elapsed time between when the operator 20 heard the audio, understood its meaning and transcribed it, the time stamp can be displaced from the actual audio data by a significant amount of time. Therefore, without further refinement, the closed captions would appear on the display screen a significant time after the speech had already been spoken.

To refine the time stamps, the closed caption data 23 is input to a re-aligner unit 24. The re-aligner unit 24 receives the roughly aligned closed caption data 23 as well as the audio stream data 12. As will be described below, the re-aligner unit 24 automatically aligns the closed caption data 23 with the related speech contained in the audio stream 12. Accordingly, the closed captions will appear on the display screen in close temporal proximity to the beginning of the associated speech and will disappear in close temporal proximity to the end of the associated speech. Finally, the aligned closed caption data is input to a segmenter unit 26 which detects acoustic clues, such as long silences, for determining where to break the stream of closed captions. Such an operation is important since the operator 20 does not typically transcribe punctuation, which would otherwise indicate where a captioned sentence or phrase caption should end. Ultimately, the newly aligned closed caption data 28 is output from the segmenter unit 26 and will be joined with the audio stream 12, the non-speech caption stream 15 and a related video stream 29 to generate a complete closed captioned program.

Figure 2:
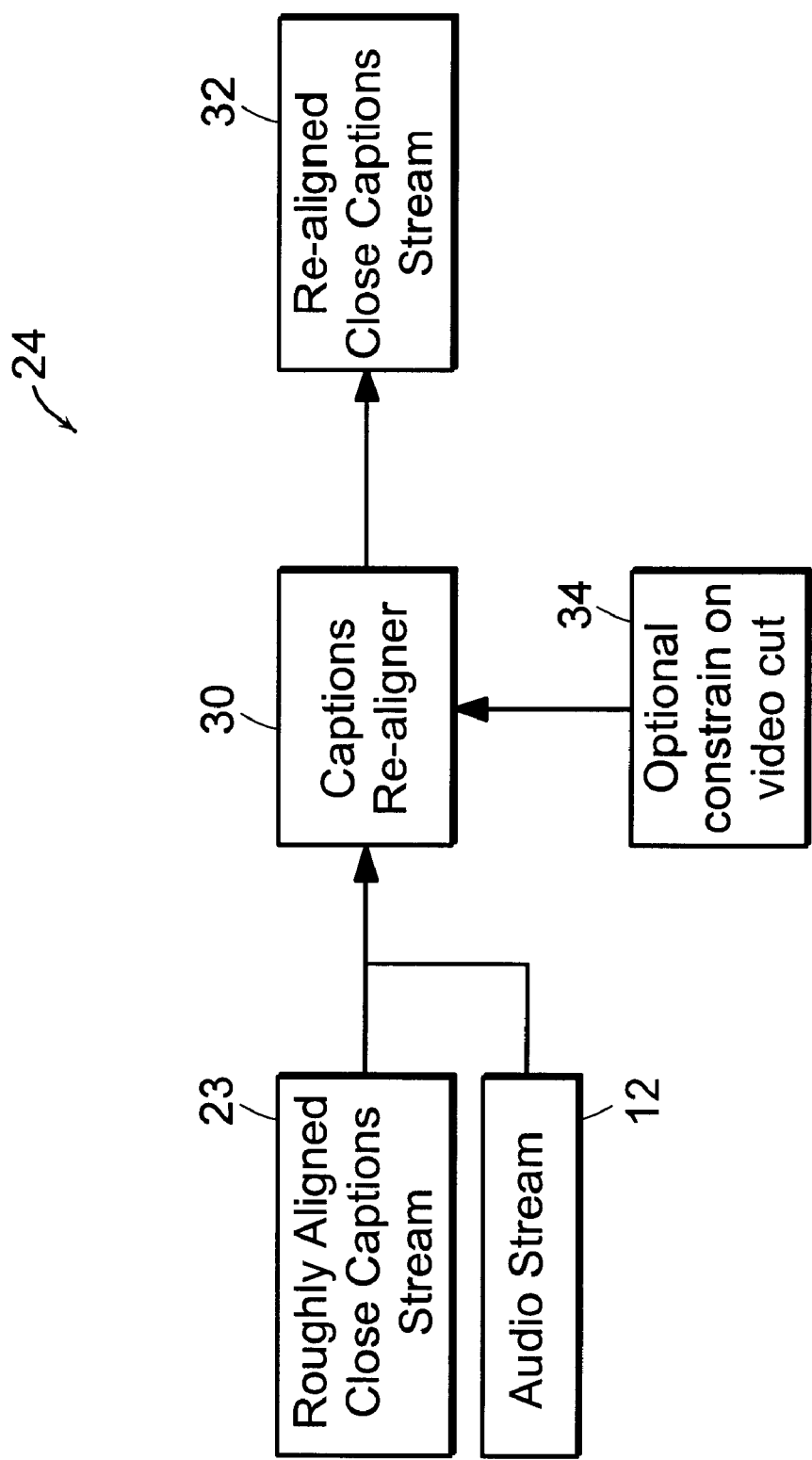
FIG. 2 is a functional block diagram of the operation of the re-aligner unit of the system of FIG. 1, according to the present invention.

Referring now to FIG. 2, a schematic diagram of the re-aligner unit 24 is shown to receive the roughly aligned closed caption data 23 and the audio stream data 12. Both of those data streams are input to a captions re-aligner unit 30. The captions re-aligner unit 30 performs a single pass alignment operation according to the present invention.

Optionally, the captions re-aligner unit 30 can also adjust the aligned time stamps by predetermined amounts 34 to further enhance the readability of the closed captions by the viewer. For example, a specified number of seconds can be subtracted from the initial time stamp of the caption such that the closed caption appears just before the phrase is actually spoken. Also, another specified number of seconds can be added to the duration of the caption such that the viewer has time to complete the reading of the caption before it disappears. In such a manner, a re-aligned close caption stream 32 is produced.

Figure 3A:
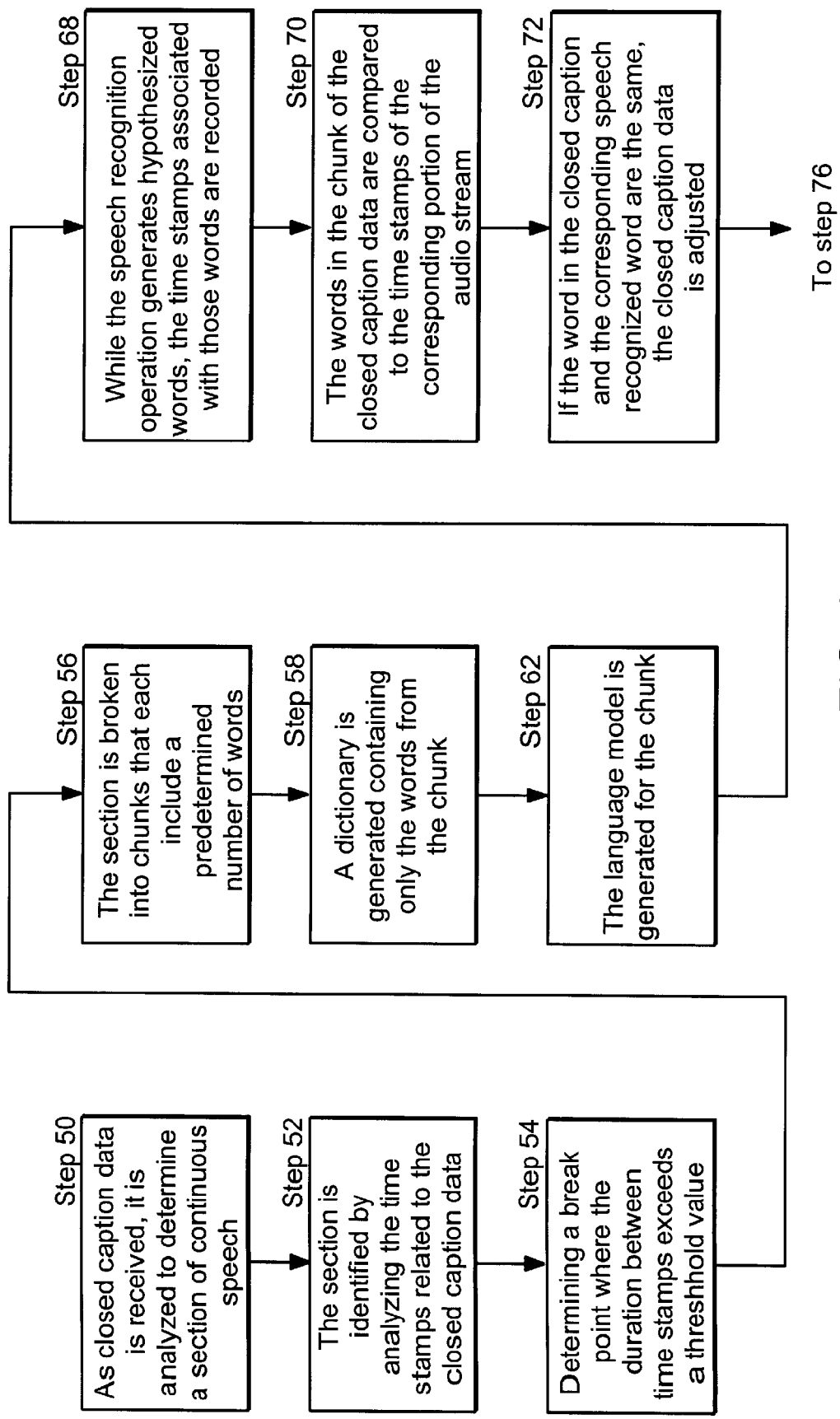
FIGS. 3A and 3B are flow diagrams of the re-alignment operation depicted in FIG. 2.
Figure 3B:
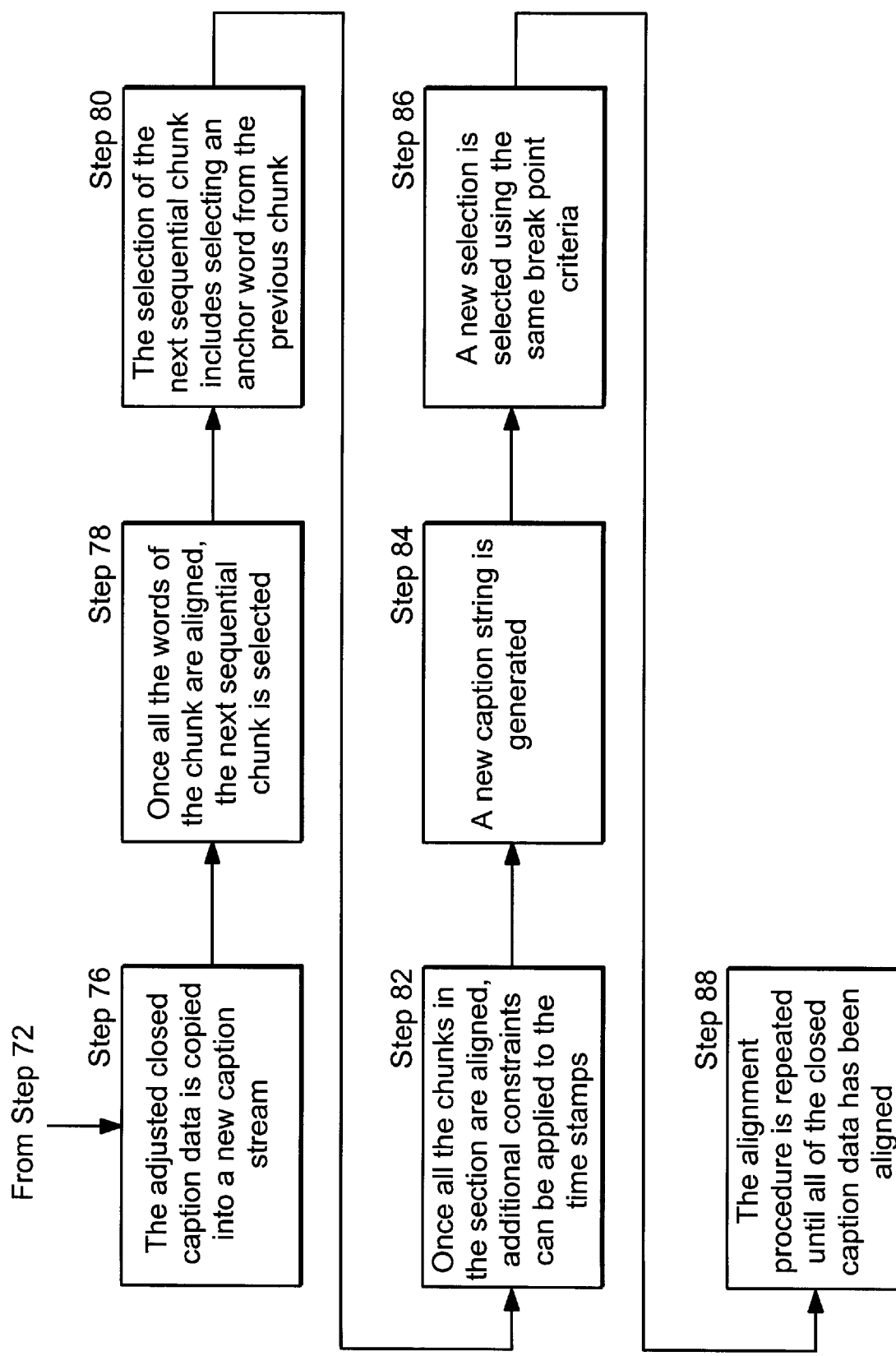

Referring now to FIGS. 3A and 3B, a flow diagram of the operation performed by the captions re-aligner unit 30 is shown. As the roughly aligned closed caption data 23 is received the associated time stamps are analyzed to determine a section of relatively continuous speech, such as a single statement by an actor, wherein the amount of time between words or individual phrases is very short (Step 50). That section is identified by analyzing the time stamps that are interspersed within the closed caption data 23 (Step 52). When the duration between time stamps exceeds a predetermined threshold value, typically on the order of two seconds, the break point of the section is identified (Step 54). It should be noted that the duration between closed captions that is used to delineate the break point of a section is not limited to two seconds but rather can be adjusted to suit any given application.

For illustration purposes, consider three different groups of closed caption data 23 that sequentially arrive at the captions re-aligner unit 30. The first group of closed caption data has a time stamp indicating when it begins, relative to the beginning of the audio data. The second group of closed caption data has a time stamp that indicates that it began one second after the first group ended. The third group of closed caption data has a time stamp that indicates that it began five seconds after the second group ended. If the predetermined delay that delineates a section break is two seconds, then the captions re-aligner unit 30 would include the first two groups of closed caption data in the same section. Since the time delay between the second and third groups is greater than two seconds, the third group would not be included in the first section but, rather, would be included in the subsequent section.

Once the section is delineated, it is broken into a series of chunks that each include a predetermined number of words (Step 56). The words contained in each chunk will be subsequently aligned with the related portion of the audio stream 12. That alignment is performed in a series of steps beginning with the generation of a dictionary that contains only the words from the instant chunk (Step 58). The dictionary is used to expand each word in the chunk as one or more sequences of phonemes. For instance, the word "are" is expanded as the sequence of phonemes "ah" and "er". The phonemes for each word are copied into the dictionary for the instant chunk to be used in a subsequent speech recognition operation.

A language model is generated that includes the relative probabilities of all one, two and three word combinations that are found within the chunk (Step 62). In other words, it provides the probability that each combination of one, two and three words will occur within the chunk. For illustration purposes, consider a chunk that contains ten words. The probability of each word occurring (referred to as the unigram) is equal to the number of times that each word appears in the chunk divided by the total number of words in that chunk. In other words, if the word "we" appears three times, then the probability that is associated with that word in the unigram is thirty percent. Likewise, the probability that any two words will occur within the chunk (referred to as the bigram) is equal to the number of times that any two-word combination occurs in the chunk, divided by the total number of two-word combinations. For example, if the phrase "we are" occurs twice in the chunk and there are five two-word occurrences then the probability of that phrase occurring is forty percent. The trigram is generated by repeating the same procedure for all three-word combinations.

Subsequently, a speech recognition operation is performed on the portion of the audio stream that corresponds to the instant chunk (Step 66). The portion of the audio stream is determined such that it will likely cover the spoken words of the chunk. In other words, the chosen portion of the audio stream begins before the time stamp of the first word and ends after the time stamp of the last word. The speech recognition operation uses the dictionary and language model such that the number of possible words and phrases that it can hypothesize are only those contained within the model. Therefore, since the vocabulary and language model includes only a limited number of words, the accuracy of the hypothesis is dramatically improved. Accordingly, the hypothesized words that are output from the speech recognition operation are typically very close to the words contained in the associated closed caption data.

While the speech recognition operation is generating hypothesized words, the relative time that those words were recognized in the audio stream is also recorded (Step 68). Thereafter, the words contained in the chunk of the closed caption data 23 are compared with the words of the corresponding speech recognized chunk of the audio stream (Step 70). If a word in the closed caption is the same as the corresponding speech recognized word, the time stamp in the closed caption data 23 is accordingly adjusted (Step 72).

Once the time stamps for the closed caption data have been adjusted, the words of the chunk are in alignment with the related words in the audio stream. Therefore, the closed captions will appear during the time period between the beginning of the first spoken word and the end of the last spoken word that are associated with the chunk. The adjusted closed caption data is copied into a new caption stream (Step 76).

It should be noted that in the context of closed captioning, the important time stamps are those associated with the first and last words in each chunk. Accordingly, in an alternative embodiment, only time stamps that are associated with the first and last words can be aligned with the time stamps determined by the speech recognition operation.

Once all the words of the chunk are aligned with the corresponding portions of the audio stream, the next sequential chunk in the section is selected (Step 78). The next sequential chunk begins with a word, referred to as an anchor, within the previous chunk that has already been precisely aligned. In other words, there is a high degree of "confidence" that the anchor word has been correctly recognized and agrees with the corresponding closed caption word. The degree of confidence is determined by a value referred to as a confidence score that is based upon the probability that a given word has been correctly recognized and aligned. It should be noted that there are many known methods for determining confidence scores, any of which can be used with the present invention. Once the anchor is determined, the words that comprise the chunk are operated on as described above (Step 80).

In this manner each chunk in the section is sequentially aligned. Once the entire section is aligned, additional constraints can be applied to the time stamp values such as adding delays to the beginning and ending captions of the section or aligning the captions with image cuts such that they appear and disappear in alignment with scene changes in addition to the audio stream (Step 82). Finally, a new caption stream 28 is generated from the manipulated closed caption data (Step 84).

Once the section has been aligned, a new section is selected using the same break point criteria described above (Step 86). Subsequently, the alignment procedure is repeated (Step 88). New sections are selected until the roughly aligned closed caption data 23 has completely been aligned with the audio stream 12. The present method works well because it operates on chunks that have well defined beginning and ending points, or time stamps.

Figure 4:
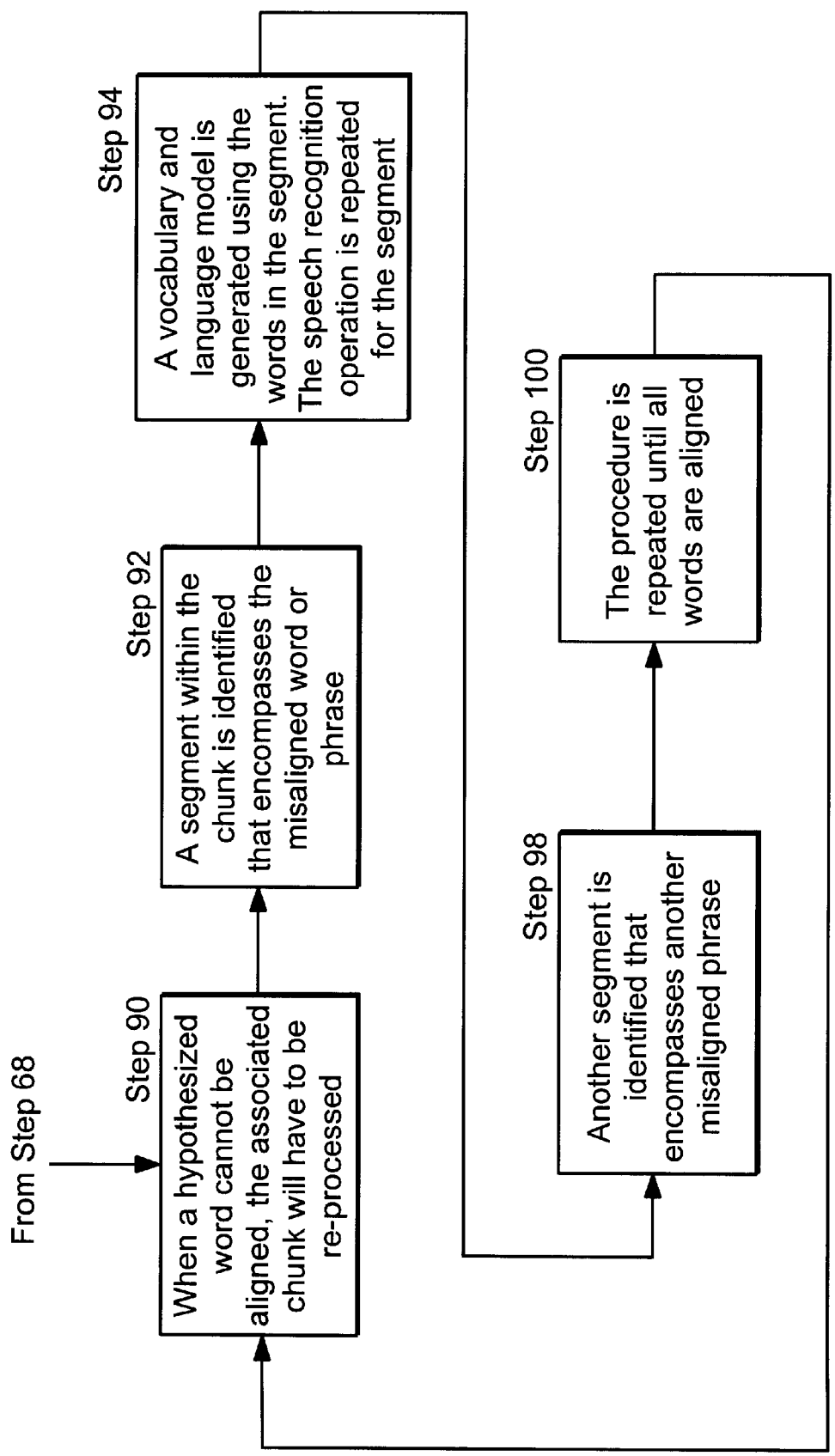
FIG. 4 is a flow diagram of a further embodiment of the present invention.

Referring now to FIG. 4, a flow diagram depicts an alternative embodiment of the present invention. While the preferred embodiment of the invention involves a single pass approach, an alternative embodiment includes a limited amount of recursion that is performed when the speech recognition operation yields an incorrect hypothesis. When the speech recognition operation generates one or more hypothesized words that cannot be aligned with the associated closed caption data, for example where an extra word is inserted in a sentence, the associated chunk will have to be reprocessed (Step 90). When the chunk is reprocessed, a segment within that chunk is identified which encompasses the misaligned words (Step 92). The segment is delineated by the closest anchor words, i.e. the closest aligned words on either side of the mis-aligned word or phrase. A vocabulary and language model is generated using the words within the segment and a speech recognition operation is again performed on the corresponding audio data (Step 94). Presumably, the speech recognition operation would correctly recognize more of the segment, allowing it to become aligned. Subsequently, another segment is identified that encompasses any remaining misaligned words and the procedure is repeated (Step 98). The procedure is repeated until all of the words are aligned (Step 100). Alternatively, the procedure can be repeated until subsequent passes do not cause any more words to be aligned. In other words, the procedure can be repeated until a point of significantly diminished returns is reached. It should be noted that due to the effectiveness of the alignment procedure, the additional recursive steps are rarely executed.

An alternative embodiment can be implemented for relatively short chunks of approximately ten seconds or less, where there is a high level of confidence that the chunk's anchor words are correctly aligned,. Rather than using a general language model that specifies unigrams, bigrams or trigrams (as described above), a language model can be used that only includes the words in the chunk and a representation of the order in which they are found in the chunk. Such an approach is referred to as "forced recognition". When forced recognition is utilized, its purpose is to determine the beginning and ending of each word in the chunk and therefore can be used to determine the time period when a closed caption is displayed. The advantage of such an approach is that it is not recursive and can be applied in a single pass fashion.

Figure 5:
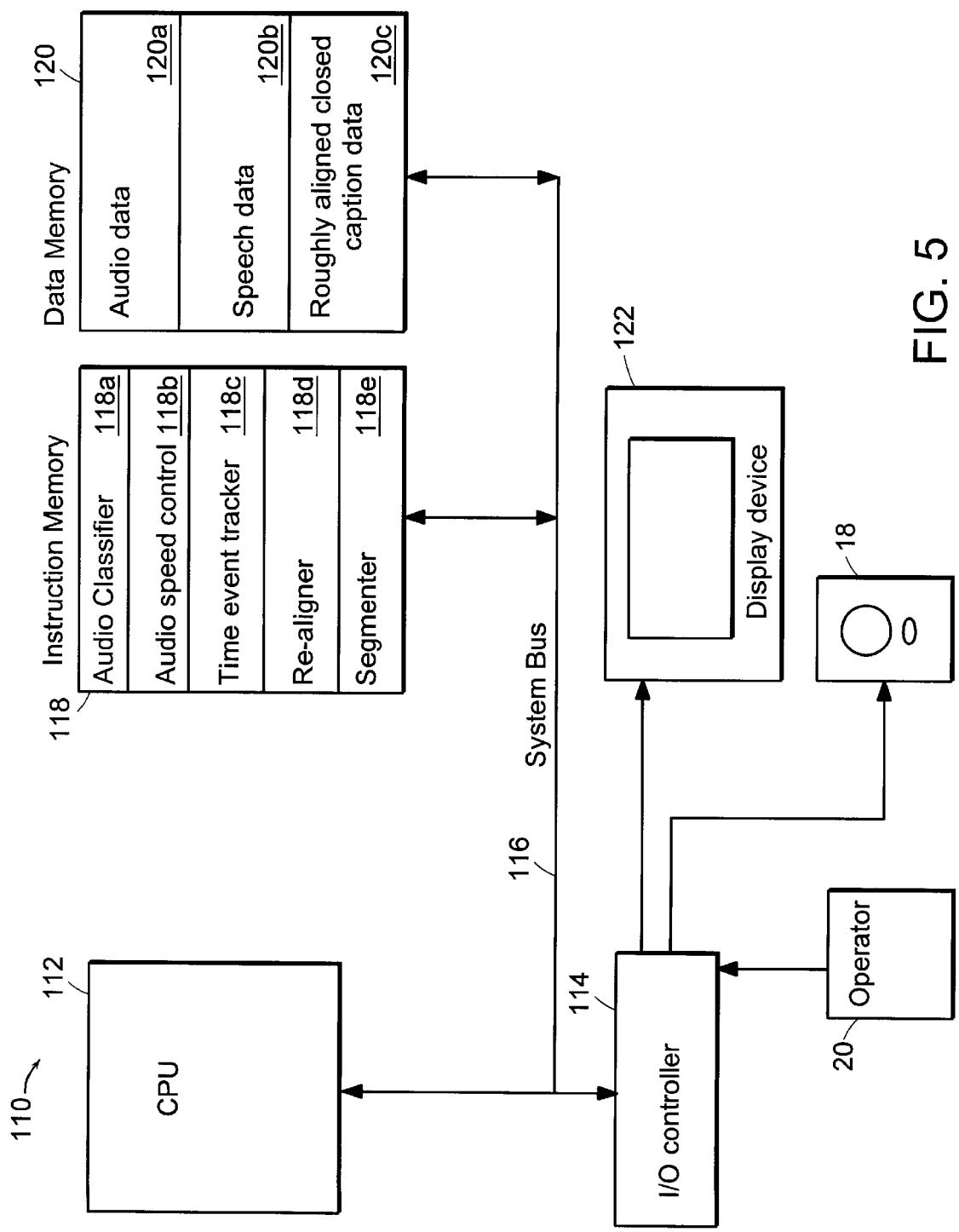
FIG. 5 is a schematic diagram of a computer system on which the alignment operation of FIG. 2 can be performed.

It should be noted that each of the elements that compose the system 10 for automatically aligning a closed caption stream can be implemented in either hardware or software. Referring to FIG. 5, a computer system 110 is shown in which the elements of system 10 are implemented as software units. Computer system 110 includes a central processing unit (CPU) 112 and an I/O controller 114 that are connected by a system bus 116. The I/O controller 114 allows access between the CPU 112 and a display device 122 (such as a CRT). The I/O controller 114 also allows the CPU 112 to output speech data to an attached speaker 18 and receive an associated transcription from an operator 20.

The system bus 116 also connects the CPU 112 to an instruction memory subsystem 118 and a data memory subsystem 120. The instruction memory subsystem 118 stores the executable code for each of the units that compose system 110 such as the code for the audio classifier unit 118*a*, the speech rate control unit 118*b*, the time event tracker unit 118*c*, the re-aligner unit 118*d* and the segmenter unit 118*e*. The data input to and generated by each of those units, such as the audio data 120*a*, the speech data 120*b* and the roughly aligned closed caption data 120*c*, is stored in data memory 120.

Generally, CPU 112 executes the audio classifier code 118*a* to classify the audio data 120*a* as containing speech or non-speech components. The audio speed control code 118*b* is executed to output the speech components of the audio data 120*a* to the speaker 18 through the I/O controller 114. The operator 20 listens to the speech output through the speaker 18 and transcribes the speech. The transcription is collected by the time event tracker application 118*c* which inserts time stamps into the transcription, thereby generating the roughly aligned closed caption data 120*c*. Subsequently, the realigner application 118*d* is executed to more precisely align the closed captions to the corresponding portions of the audio data 120*a*. Finally, the aligned closed caption data is input to the segmenter application 118*e* for detecting acoustic clues, such as long silences, for determining where to break the stream of closed captions.

Accordingly, a method and apparatus for automatically aligning closed caption data with the related audio data has been disclosed. With such a system, closed captions can be made to appear and disappear in direct relation to associated spoken words and phrases. Also, the aligned closed caption data can be more precisely indexed to a requested keyword by a search engine.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for automatically aligning closed captions, comprising:

an audio classifier unit, for receiving audio data and identifying portions of the audio data that comprise speech data;

a speech rate control unit, coupled to the audio classifier unit for outputting the portions of the audio data that include speech, adjusts the speech data rate such that an operator can more easily perform transcription;

a time event tracker unit, coupled to the audio speed control unit, for receiving the speech portions of the audio data and for receiving a transcription of the speech portions of the audio data that is generated by the operator, the time event tracker unit also for inserting time stamps in the transcription that indicate the time when portions of the transcription were generated by the operator and the time stamped transcription being output as a roughly aligned closed caption stream; and a re-aligner unit for precisely aligning the roughly aligned closed caption stream in a non-recursive manner, wherein the re-aligner unit comprises a captions re-aligner unit that receives the roughly aligned closed caption stream and the associated audio data stream and segments both streams into sections based upon a threshold duration between the time stamps in the roughly aligned closed caption stream, the captions re-aligner unit also breaking each section into a number of chunks and generating a language model using only the words contained in each chunk, the captions re-aligner unit using the language model to perform a speech recognition operation on the audio data stream and to generate a hypothesized word list, a plurality of time stamps in the roughly aligned closed caption stream being modified to aligning with a plurality of time stamps in the hypothesized word list.

2. The apparatus for automatically aligning closed captions, as described in claim 1, wherein the plurality of time stamps in the roughly aligned closed caption stream were determined in response to a transcription of a plurality of words spoken in the audio data stream.

3. The apparatus for automatically aligning closed captions, as described in claim 2, wherein the plurality of time stamps in the hypothesized word list correspond to words in a chunk.

4. The apparatus for automatically aligning closed captions, as described in claim 3, wherein the captions re-aligner unit further determines whether the hypothesized word list contains the same words as the corresponding chunk of the roughly aligned closed caption stream and performs a recursive alignment operation on the portions of the chunk that are different.

5. The apparatus for automatically aligning closed captions, as described in claim 1, further comprising:

a segmenter unit, coupled to the re-aligner unit for detecting acoustic clues for determining where to break the closed caption stream.

6. A computer system, comprising:

a central processing unit connected to a memory system by a system bus;

an I/O controller, connected to the central processing unit and to the memory system by the system bus;

an audio classifier application, executed by the central processing unit, for receiving audio data and identifying portions of the audio data that comprise speech data;

a speech rate control application, executed by the central processing unit, for outputting the portions of the audio data that include speech at a predetermined rate;

a time event tracker application, executed by the central processing unit, for receiving the speech portions of the audio data from the speech rate control application and for receiving a transcription of the speech portions of the audio data, the time event tracker applications also for inserting time stamps in the transcription that indicate the time when portions of the transcription were received and the time stamped transcription being output as a roughly aligned closed caption stream; and a re-aligner application, executed by the central processing unit, for precisely aligning the roughly aligned closed caption stream, wherein the re-aligner application comprises a captions re-aligner portion that receives the roughly aligned closed caption stream and the associated audio data stream and segments both streams into sections based upon a threshold duration between time stamps in the roughly aligned closed caption stream, the captions realigner portion also breaking each section into a number of chunks and generating a language model using only the words contained in each chunk, the captions re-aligner portion using the language model to perform a speech recognition operation on the audio data stream and to generate a hypothesized word list, a plurality of time stamps in the roughly aligned closed caption stream being modified to align with a plurality of time stamps in the hypothesized word list.

7. The computer system described in claim 6, wherein the plurality of time stamps in the roughly aligned closed caption stream were determined in response to a transcription of a plurality of words spoken in the audio data stream.

8. The computer system described in claim 7, wherein the plurality of time stamps in the hypothesized word list correspond to a first word of a chunk and correspond to a last word of a chunk.

9. The computer system described in claim 7, wherein the captions re-aligner portion further determines whether the hypothesized word list contains the same words as the corresponding chunk of the roughly aligned closed caption stream and performs a recursive alignment operation on the portions of the chunk that are different.

* * * * *

UNITED STATES PATENT AND TRADEMARK OFFICE
CERTIFICATE OF CORRECTION

PATENT NO.   : 6,442,518 B1  Page 1 of 1
DATED        : August 27, 2002
INVENTOR(S)  : Jean-Manuel Can Thong and Pedro Moreno It is certified that error appears in the above-identified patent and that said Letters Patent is hereby corrected as shown below:

<u>Column 9,</u>
Line 14, "*Aligning*" should read -- *Align* --.

Signed and Sealed this

Fourteenth Day of January, 2003

JAMES E. ROGAN
*Director of the United States Patent and Trademark Office*